(12) United States Patent
Yang et al.

(10) Patent No.: US 10,581,254 B2
(45) Date of Patent: Mar. 3, 2020

(54) EQUALIZATION CURRENT ADJUSTMENT METHOD AND RELATED APPARATUS

(71) Applicant: HUAWEI TECHNOLOGIES CO., LTD., Shenzhen, Guangdong (CN)

(72) Inventors: Rui Yang, Shanghai (CN); Xiaokang Liu, Shanghai (CN); Zhiwei Wu, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 138 days.

(21) Appl. No.: 15/948,833

(22) Filed: Apr. 9, 2018

(65) Prior Publication Data
US 2018/0226809 A1 Aug. 9, 2018

Related U.S. Application Data

(63) Continuation of application No. PCT/CN2016/079421, filed on Apr. 15, 2016.

(30) Foreign Application Priority Data

Oct. 9, 2015 (CN) .......................... 2015 1 0648284

(51) Int. Cl.
H02J 7/00 (2006.01)
H02J 7/14 (2006.01)
H02M 3/335 (2006.01)
H01M 2/10 (2006.01)

(52) U.S. Cl.
CPC ......... H02J 7/0014 (2013.01); H01M 2/1016 (2013.01); H02J 7/007 (2013.01); H02J 7/0018 (2013.01); H02M 3/33507 (2013.01)

(58) Field of Classification Search
USPC .......................... 320/107, 108, 116, 119, 124
See application file for complete search history.

(56) References Cited

U.S. PATENT DOCUMENTS

| 5,631,534 | A | 5/1997 | Lewis |
| 5,659,237 | A | 8/1997 | Divan et al. |
| 2010/0190041 | A1 | 7/2010 | Hou et al. |
| 2011/0084668 | A1 | 4/2011 | Nakao |

(Continued)

FOREIGN PATENT DOCUMENTS

| CN | 201584799 U | 9/2010 |
| CN | 102324838 A | 1/2012 |

(Continued)

Primary Examiner — Alexis B Pacheco
(74) Attorney, Agent, or Firm — Womble Bond Dickinson (US) LLP

(57) ABSTRACT

An equalization current adjustment method includes: determining a battery unit to be equalized in a battery pack, and obtaining a current actual equalization current value of the battery unit; and when it is determined that a difference between the current actual equalization current value of the battery unit and a target equalization current value does not fall within a range of a preset threshold, adjusting a fundamental amplitude of an alternating current power supply of a target circuit on which the battery unit is located and/or a voltage gain of the target circuit, so that the difference between the current actual equalization current value of the battery unit and the target equalization current value falls within the range of the preset threshold.

16 Claims, 7 Drawing Sheets

(56) References Cited

U.S. PATENT DOCUMENTS

| | | | |
|---|---|---|---|
| 2011/0140663 A1 | 6/2011 | Tofigh et al. | |
| 2012/0223679 A1* | 9/2012 | Iwai | H01M 10/465 320/128 |
| 2013/0214733 A1 | 8/2013 | Liang et al. | |
| 2014/0021959 A1* | 1/2014 | Maluf | H01M 10/44 324/430 |
| 2015/0145520 A1 | 5/2015 | Kain | |
| 2015/0377976 A1* | 12/2015 | Maluf | H02J 7/0047 702/63 |
| 2017/0045588 A1* | 2/2017 | Aoki | G01R 27/14 |

FOREIGN PATENT DOCUMENTS

| | | |
|---|---|---|
| CN | 102684263 A | 9/2012 |
| CN | 103094963 A | 5/2013 |
| CN | 103501025 A | 1/2014 |
| CN | 103501033 A | 1/2014 |
| CN | 103595092 A | 2/2014 |
| CN | 104678307 A | 6/2015 |
| CN | 106329592 A | 1/2017 |
| FR | 2927200 A1 | 8/2009 |
| JP | 2010172182 A | 8/2010 |

* cited by examiner

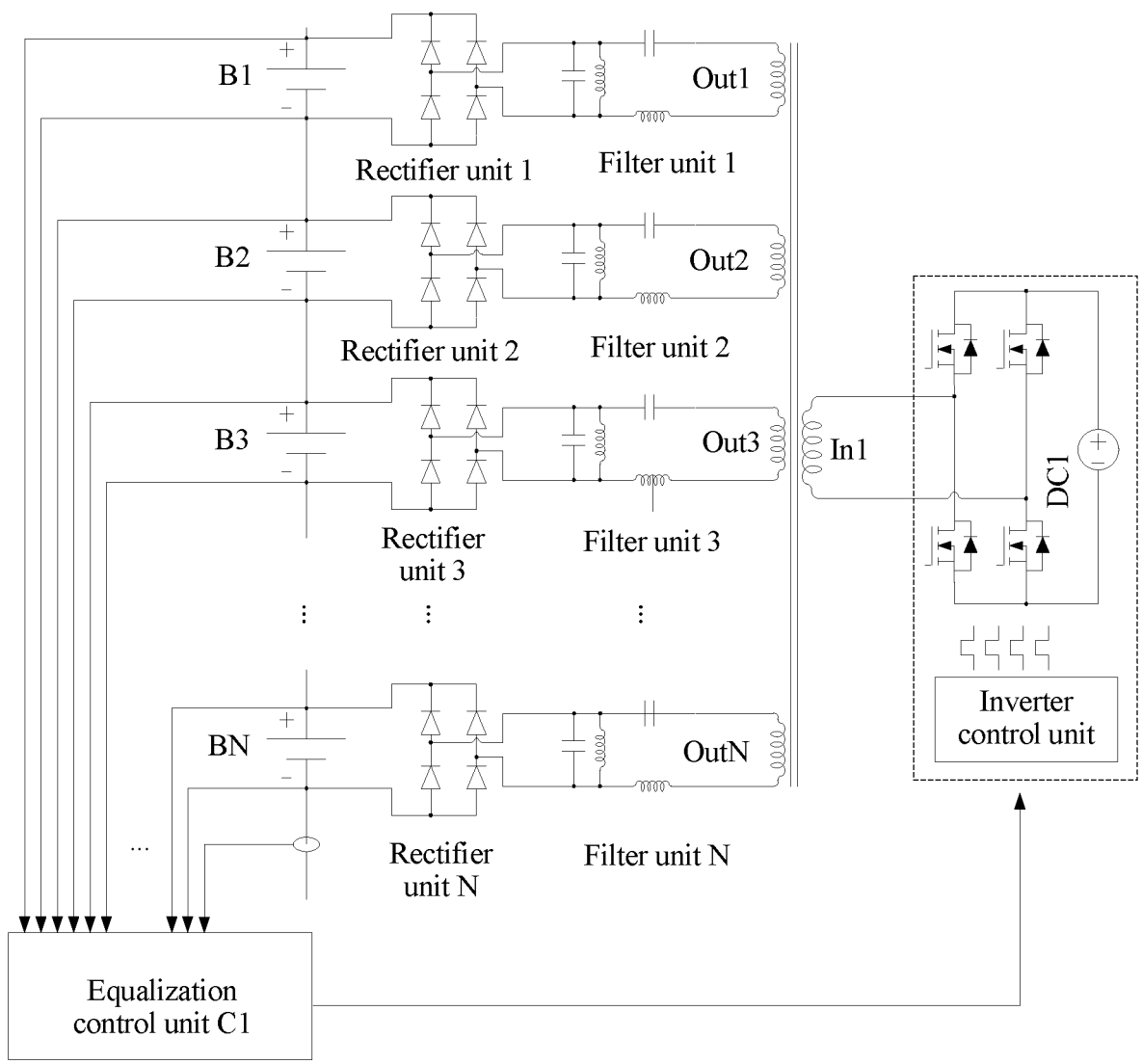
FIG. 3-a

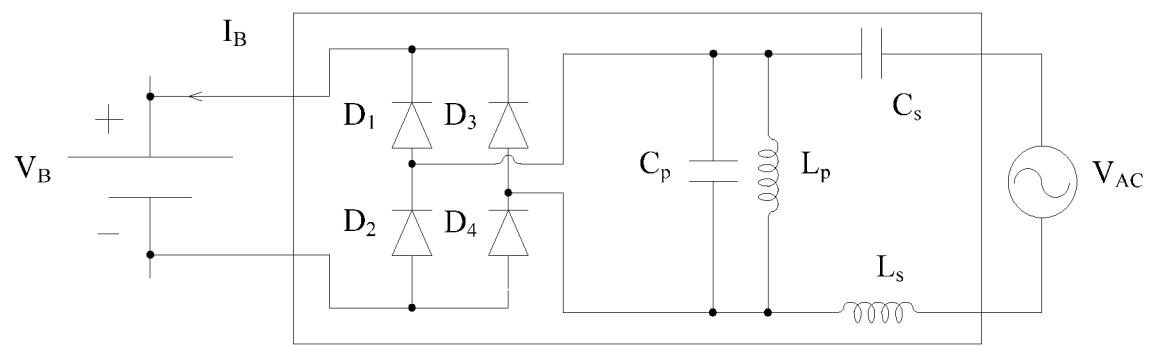
FIG. 3-b

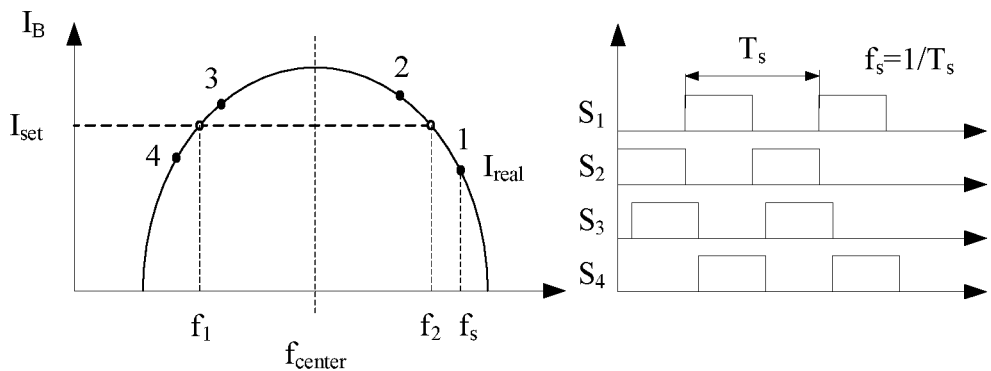
FIG. 5-a
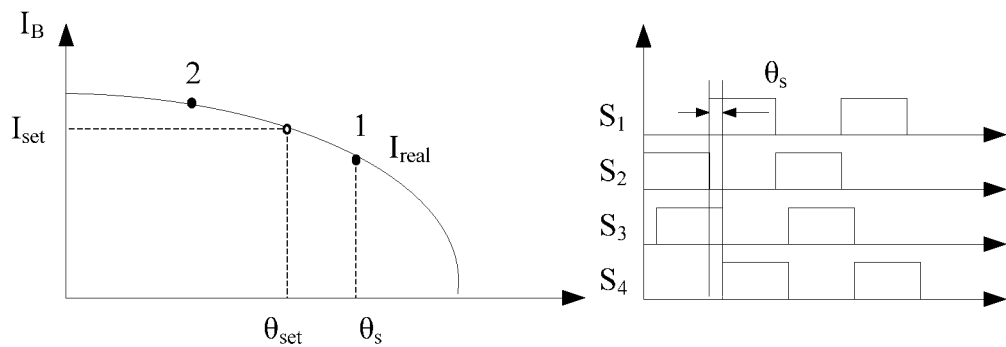
FIG. 5-b
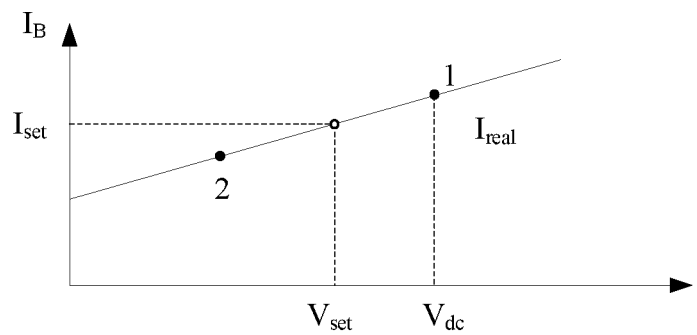
FIG. 5-c

EQUALIZATION CURRENT ADJUSTMENT METHOD AND RELATED APPARATUS

CROSS-REFERENCE TO RELATED APPLICATIONS

This application is a continuation of International Application No. PCT/CN2016/079421, filed on Apr. 15, 2016, which claims priority to Chinese Patent Application No. 201510648284.X, filed on Oct. 9, 2015. The disclosures of the aforementioned applications are hereby incorporated by reference in their entireties.

TECHNICAL FIELD

The present application relates to the battery field, and specifically, to an equalization current adjustment method and a related apparatus.

BACKGROUND

A typical battery pack is formed by connecting multiple battery units in series or parallel. Energy leakage occurs on a battery unit in a rechargeable battery pack during a non-use or storage period. Energy leakage and maximum capacity attenuation of a battery unit cause all battery units in the battery pack to have different energy levels compared with each other. An equalization circuit is configured to equalize energy of a series battery pack, and control current directions and magnitudes of different battery units, so that the battery units in the battery pack tend to have consistent energy.

A rate of battery pack energy equalization is related to a magnitude of an equalization current. When an energy difference between battery units in a battery pack is relatively large, a relatively high equalization current is required. When an energy difference between battery units in a battery pack is relatively small, a relatively low equalization current is required. In one charge and discharge cycle of a battery pack, affected by an individual difference, energy levels of battery units present different distribution. A corresponding battery unit that needs to be equalized and a corresponding equalization current need to be adjusted. During use of a large-scale battery pack, a battery status needs to be monitored, so as to avoid overcharging or over-discharging of a battery unit. A state of charge (SOC) is a parameter commonly used for monitoring a battery status. An operating current of a battery is one of variables required for SOC calculation.

Conventional series batteries without an equalization function have a same series operating current. Therefore, provided that a current sensor is placed at a current outlet or inlet of a series battery pack, an operating current of the battery pack may be detected. After the equalization function is introduced, due to impact of an equalization current, an equivalent operating current of the series battery pack is no longer equal to the current detected at the current outlet or inlet of the series batteries by the current sensor, and operating currents of the series batteries are no longer equal to each other. If the current detected by the current sensor is used for SOC calculation of the series battery pack, SOC calculation accuracy of the series battery pack is reduced. If a same operating current is used for SOC calculation of different battery units connected in series, SOC calculation accuracy of a battery unit is reduced. Therefore, during SOC calculation of a battery pack having the equalization function, precisely obtaining an equalization current helps improve SOC calculation accuracy and improve performance of a battery pack monitoring apparatus.

Currently, there is an equalization current control method based on a bidirectional flyback active equalization circuit, that is, a driver signal pulse width of a bidirectional flyback unit is adjusted according to a required equalization current, so as to indirectly adjust a magnitude of an active equalization current of a battery unit. However, in this adjustment method, equalization currents of different battery units are also related to their respective end voltages. Adjusting a driver signal pulse width can only implement equalization current adjustment within a limited range. In addition, when an end voltage difference in a battery pack is relatively small, a current may be adjusted only in a narrow range with low flexibility.

SUMMARY

Embodiments of the present application provide an equalization current adjustment method and a related apparatus, so as to resolve a prior-art problem that an equalization current may be adjusted only in a narrow range with low flexibility.

A first aspect of the present application provides an equalization current adjustment method, where the equalization current adjustment method is applied to a frequency gating battery pack active equalization apparatus, and includes:

determining a battery unit to be equalized in a battery pack, and obtaining a current actual equalization current value of the battery unit; and when it is determined that a difference between the current actual equalization current value of the battery unit and a target equalization current value does not fall within a range of a preset threshold, adjusting a fundamental amplitude of an alternating current power supply of a target circuit on which the battery unit is located and/or a voltage gain of the target circuit, so that the difference between the current actual equalization current value of the battery unit and the target equalization current value falls within the range of the preset threshold, where the target equalization current value is an equalization current value determined by the frequency gating battery pack active equalization apparatus according to a current energy status of the battery unit, and the target circuit is a circuit that includes a circuit component connected to the battery unit, the alternating current power supply, and the battery unit.

In one embodiment, the obtaining a current actual equalization current value of the battery unit includes:

obtaining the fundamental amplitude of the alternating current power supply of the target circuit and the voltage gain of the target circuit; and obtaining, by calculation, the current actual equalization current value of the battery unit according to the fundamental amplitude of the alternating current power supply of the target circuit and the voltage gain of the target circuit.

In one embodiment, the obtaining a current actual equalization current value of the battery unit includes:

detecting a current of the battery unit by using a sensor, so as to obtain the current actual equalization current value of the battery unit.

In one embodiment, the obtaining the fundamental amplitude of the alternating current power supply of the target circuit and the voltage gain of the target circuit includes:

obtaining a driver phase shift angle and a voltage amplitude of a direct current power supply that are related to the fundamental amplitude of the alternating current power supply of the target circuit, where the driver phase shift angle is a driver phase shift angle of a switch structure in the alternating current power supply, and the alternating current power supply is formed according to the direct current power supply and the switch structure in the alternating current power supply; and obtaining a driving frequency related to the voltage gain of the target circuit, where the driving frequency is a driving frequency of the switch structure in the alternating current power supply; and the obtaining, by calculation, the current actual equalization current value of the battery unit according to the fundamental amplitude of the alternating current power supply of the target circuit and the voltage gain of the target circuit includes:

obtaining, by calculation, the current actual equalization current value of the battery unit according to the driver phase shift angle, the voltage amplitude of the direct current power supply, and the driving frequency.

In one embodiment, the adjusting the fundamental amplitude of the alternating current power supply, so that the difference between the current actual equalization current value of the battery unit and the target equalization current value falls within the range of the preset threshold includes:

generating, according to the driver phase shift angle, a first instruction signal used to control the driver phase shift angle and/or generating, according to the voltage amplitude of the direct current power supply, a first instruction signal used to control the voltage amplitude of the direct current power supply; and outputting at least one first instruction signal in the first instruction signal used to control the driver phase shift angle and the first instruction signal used to control the voltage amplitude of the direct current power supply to a control unit corresponding to the first instruction signal, so as to adjust the fundamental amplitude of the alternating current power supply, so that the difference between the current actual equalization current value of the battery unit and the target equalization current value falls within the range of the preset threshold.

In one embodiment, the adjusting the voltage gain of the target circuit, so that the difference between the current actual equalization current value of the battery unit and the target equalization current value falls within the range of the preset threshold includes:

generating, according to the driving frequency, a second instruction signal used to control the driving frequency; and outputting the second instruction signal used to control the driving frequency to a control unit corresponding to the second instruction signal, so as to adjust the voltage gain of the target circuit, so that the difference between the current actual equalization current value of the battery unit and the target equalization current value falls within the range of the preset threshold.

In one embodiment, the adjusting the fundamental amplitude of the alternating current power supply and the voltage gain of the target circuit, so that the difference between the current actual equalization current value of the battery unit and the target equalization current value falls within the range of the preset threshold includes:

generating, according to the driver phase shift angle, a first instruction signal used to control the driver phase shift angle and/or generating, according to the voltage amplitude of the direct current power supply, a first instruction signal used to control the voltage amplitude of the direct current power supply;

generating, according to the driving frequency, a second instruction signal used to control the driving frequency; and outputting at least one first instruction signal in the first instruction signal used to control the driver phase shift angle and the first instruction signal used to control the voltage amplitude of the direct current power supply to a control unit corresponding to the first instruction signal, and outputting the second instruction signal used to control the driving frequency to a control unit corresponding to the second instruction signal, so as to adjust the fundamental amplitude of the alternating current power supply and the voltage gain of the target circuit, so that the difference between the current actual equalization current value of the battery unit and the target equalization current value falls within the range of the preset threshold.

In one embodiment, the preset threshold is a threshold defined by a user or a default threshold of the frequency gating battery pack active equalization apparatus.

In one embodiment, the target equalization current value is an equalization current value obtained from the sensor by the frequency gating battery pack active equalization apparatus or an equalization current value defined by a user.

A second aspect of the present application provides a frequency gating battery pack active equalization apparatus, including:

a determining module, configured to determine a battery unit to be equalized in a battery pack;

an obtaining module, configured to obtain a current actual equalization current value of the battery unit determined by the determining module;

a judging module, configured to determine whether a difference between the current actual equalization current value that is of the battery unit and that is obtained by the obtaining module and a target equalization current value falls within a range of a preset threshold; and an adjustment module, configured to: when the judging module determines that the difference between the current actual equalization current value of the battery unit and the target equalization current value does not fall within the range of the preset threshold, adjust a fundamental amplitude of an alternating current power supply of a target circuit on which the battery unit is located and/or a voltage gain of the target circuit, so that the difference between the current actual equalization current value of the battery unit and the target equalization current value falls within the range of the preset threshold, where the target equalization current value is an equalization current value determined by the frequency gating battery pack active equalization apparatus according to a current energy status of the battery unit, and the target circuit is a circuit that includes a circuit component connected to the battery unit, the alternating current power supply, and the battery unit.

In one embodiment, the obtaining module is configured to: obtain the fundamental amplitude of the alternating current power supply of the target circuit and the voltage gain of the target circuit, and obtain, by calculation, the current actual equalization current value of the battery unit according to the fundamental amplitude of the alternating current power supply of the target circuit and the voltage gain of the target circuit.

In one embodiment, the obtaining module is configured to detect a current of the battery unit by using a sensor, so as to obtain the current actual equalization current value of the battery unit.

In one embodiment, the obtaining module is configured to: obtain a driver phase shift angle and a voltage amplitude of a direct current power supply that are related to the fundamental amplitude of the alternating current power supply of the target circuit, where the driver phase shift angle is a driver phase shift angle of a switch structure in the alternating current power supply, and the alternating current power supply is formed according to the direct current power supply and the switch structure in the alternating current power supply; obtain a driving frequency related to the voltage gain of the target circuit, where the driving frequency is a driving frequency of the switch structure in the alternating current power supply; and obtain, by calculation, the current actual equalization current value of the battery unit according to the driver phase shift angle, the voltage amplitude of the direct current power supply, and the driving frequency that are obtained by the obtaining module.

In one embodiment, the adjustment module is configured to: generate, according to the driver phase shift angle, a first instruction signal used to control the driver phase shift angle and/or generate, according to the voltage amplitude of the direct current power supply, a first instruction signal used to control the voltage amplitude of the direct current power supply; and output at least one first instruction signal in the first instruction signal used to control the driver phase shift angle and the first instruction signal used to control the voltage amplitude of the direct current power supply to a control unit corresponding to the first instruction signal, so as to adjust the fundamental amplitude of the alternating current power supply, so that the difference between the current actual equalization current value of the battery unit and the target equalization current value meets the preset threshold.

In one embodiment, the adjustment module is configured to: generate, according to the driving frequency, a second instruction signal used to control the driving frequency, and output the second instruction signal used to control the driving frequency to a control unit corresponding to the second instruction signal, so as to adjust the voltage gain of the target circuit, so that the difference between the current actual equalization current value of the battery unit and the target equalization current value meets the preset threshold.

In one embodiment, the adjustment module is configured to: generate, according to the driver phase shift angle, a first instruction signal used to control the driver phase shift angle and/or generate, according to the voltage amplitude of the direct current power supply, a first instruction signal used to control the voltage amplitude of the direct current power supply; generate, according to the driving frequency, a second instruction signal used to control the driving frequency; output at least one first instruction signal in the first instruction signal used to control the driver phase shift angle and the first instruction signal used to control the voltage amplitude of the direct current power supply to a control unit corresponding to the first instruction signal; and output the second instruction signal used to control the driving frequency to a control unit corresponding to the second instruction signal, so as to adjust the fundamental amplitude of the alternating current power supply and the voltage gain of the target circuit, so that the difference between the current actual equalization current value of the battery unit and the target equalization current value meets the preset threshold.

In one embodiment, the preset threshold is a threshold defined by a user or a default threshold of the frequency gating battery pack active equalization apparatus.

In one embodiment, the target equalization current value is an equalization current value obtained from the sensor by the frequency gating battery pack active equalization apparatus or an equalization current value defined by a user.

A third aspect of the present application provides a frequency gating battery pack active equalization apparatus, including: a controlled alternating current power supply, an alternating current electric energy allocation unit, a filter unit, a rectifier unit, and an equalization control unit, where the controlled alternating current power supply is connected to the alternating current electric energy allocation unit, the alternating current electric energy allocation unit is connected to the filter unit, the filter unit is connected to the rectifier unit, the rectifier unit is connected to a battery unit, the battery unit is connected to the equalization control unit, and the equalization control unit is connected to the controlled alternating current power supply;

the equalization control unit is configured to: determine a battery unit to be equalized in a battery pack, and obtain a current actual equalization current value of the battery unit; and the equalization control unit is further configured to: when determining that a difference between the current actual equalization current value of the battery unit and a target equalization current value does not fall within a range of a preset threshold, adjust a fundamental amplitude of an alternating current power supply of a target circuit on which the battery unit is located and/or a voltage gain of the target circuit, so that the difference between the current actual equalization current value of the battery unit and the target equalization current value falls within the range of the preset threshold, where the target equalization current value is an equalization current value determined by the frequency gating battery pack active equalization apparatus according to a current energy status of the battery unit, and the target circuit is a circuit that includes a circuit component connected to the battery unit, the alternating current power supply, and the battery unit.

In one embodiment, the equalization control unit is configured to: obtain the fundamental amplitude of the alternating current power supply of the target circuit and the voltage gain of the target circuit, and obtain, by calculation, the current actual equalization current value of the battery unit according to the fundamental amplitude of the alternating current power supply of the target circuit and the voltage gain of the target circuit.

In one embodiment, the equalization control unit is configured to detect a current of the battery unit by using a sensor, so as to obtain the current actual equalization current value of the battery unit.

In one embodiment, the equalization control unit is configured to: obtain a driver phase shift angle and a voltage amplitude of a direct current power supply that are related to the fundamental amplitude of the alternating current power supply of the target circuit, where the driver phase shift angle is a driver phase shift angle of a switch structure in the alternating current power supply, and the alternating current power supply is formed according to the direct current power supply and the switch structure in the alternating current power supply; and obtain a driving frequency related to the voltage gain of the target circuit, where the driving frequency is a driving frequency of the switch structure in the alternating current power supply; and the equalization control unit is configured to: obtain, by calculation, the current actual equalization current value of the battery unit according to the driver phase shift angle, the voltage amplitude of the direct current power supply, and the driving frequency.

In one embodiment, the equalization control unit is configured to: generate, according to the driver phase shift angle, a first instruction signal used to control the driver phase shift angle and/or generate, according to the voltage amplitude of the direct current power supply, a first instruction signal used to control the voltage amplitude of the direct current power supply; and output at least one first instruction signal in the first instruction signal used to control the driver phase shift angle and the first instruction signal used to control the voltage amplitude of the direct current power supply to a control unit corresponding to the first instruction signal, so as to adjust the fundamental amplitude of the alternating current power supply, so that the difference between the current actual equalization current value of the battery unit and the target equalization current value falls within the range of the preset threshold.

In one embodiment, the equalization control unit is configured to output the second instruction signal used to control the driving frequency to a control unit corresponding to the second instruction signal, so as to adjust the voltage gain of the target circuit, so that the difference between the current actual equalization current value of the battery unit and the target equalization current value falls within the range of the preset threshold.

In one embodiment, the equalization control unit is configured to: generate, according to the driver phase shift angle, a first instruction signal used to control the driver phase shift angle and/or generate, according to the voltage amplitude of the direct current power supply, a first instruction signal used to control the voltage amplitude of the direct current power supply; generate, according to the driving frequency, a second instruction signal used to control the driving frequency; output at least one first instruction signal in the first instruction signal used to control the driver phase shift angle and the first instruction signal used to control the voltage amplitude of the direct current power supply to a control unit corresponding to the first instruction signal; and output the second instruction signal used to control the driving frequency to a control unit corresponding to the second instruction signal, so as to adjust the fundamental amplitude of the alternating current power supply and the voltage gain of the target circuit, so that the difference between the current actual equalization current value of the battery unit and the target equalization current value falls within the range of the preset threshold.

In one embodiment, a battery unit to be equalized in a battery pack is determined, and a current actual equalization current value of the battery unit is obtained; and when it is determined that a difference between the current actual equalization current value of the battery unit and a target equalization current value does not fall within a range of a preset threshold, a fundamental amplitude of an alternating current power supply of a target circuit on which the battery unit is located and/or a voltage gain of the target circuit are/is adjusted, so that the difference between the current actual equalization current value of the battery unit and the target equalization current value falls within the range of the preset threshold. It may be learned that an equalization current is adjusted without a limit of an adjustment range by adjusting the amplitude of the alternating current power supply and/or the voltage gain, so that the equalization current may be adjusted in a wide range with high flexibility.

BRIEF DESCRIPTION OF DRAWINGS

FIG. 3-$a$ is another schematic structural diagram of a frequency gating battery active equalization apparatus according to an embodiment of the present application;

FIG. 3-$b$ is another schematic structural diagram of a frequency gating battery active equalization apparatus according to an embodiment of the present application;

FIG. 5-$a$ is a schematic diagram of an embodiment of an application scenario of equalization current adjustment according to an embodiment of the present application;

FIG. 5-$b$ is a schematic diagram of an embodiment of another application scenario of equalization current adjustment according to an embodiment of the present application;

FIG. 5-$c$ is a schematic diagram of an embodiment of another application scenario of equalization current adjustment according to an embodiment of the present application;

DESCRIPTION OF EMBODIMENTS

Embodiments of the present application provide an equalization current adjustment method and a related apparatus, so as to resolve a prior-art problem that an equalization current may be adjusted only in a narrow range with low flexibility. The embodiments of the present application further provide an equalization current calculation method, a signal processing method, and a related apparatus.

The following clearly describes the technical solutions in the embodiments of the present application with reference to the accompanying drawings in the embodiments of the present application. Apparently, the described embodiments are merely some but not all of the embodiments of the present application. All other embodiments obtained by persons skilled in the art based on the embodiments of the present application without creative efforts shall fall within the protection scope of the present application.

In the specification, claims, and accompanying drawings of the present application, the terms "first", "second", "third", "fourth", and so on are intended to distinguish between different objects but do not indicate a particular order. Moreover, the terms "including", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Before the embodiments of the present application are described, a frequency gating battery pack active equalization apparatus used in the present application is first described. The frequency gating battery active equalization apparatus is a battery unit energy equalization apparatus with a relatively small quantity of fully controlled switches, high system reliability, and high energy equalization selectivity. The apparatus is applicable to voltage-based equalization determining, SOC-based equalization determining, and the like. This is not specifically limited herein.

Figure 1:
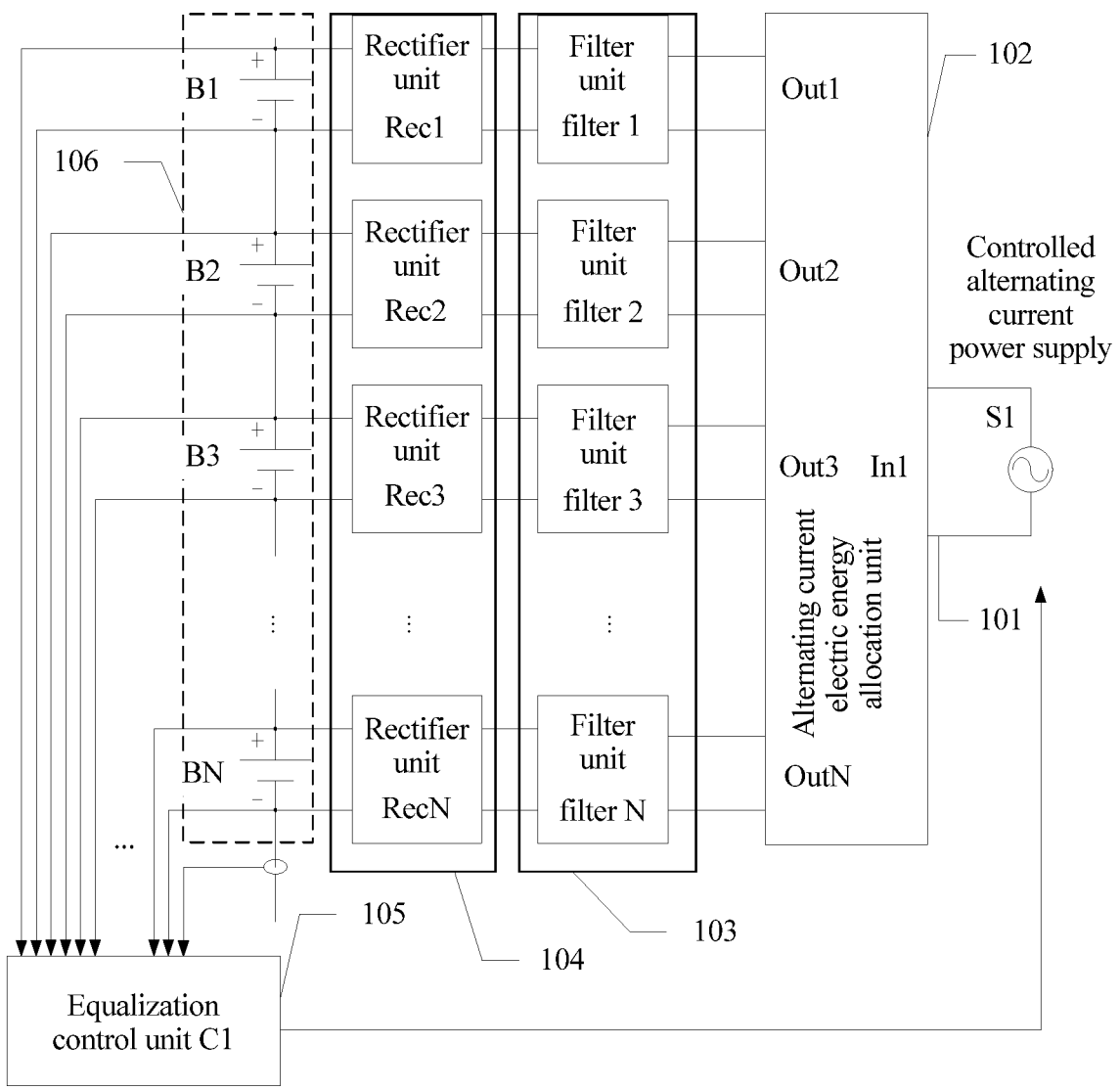
FIG. 1 is a schematic structural diagram of a frequency gating battery pack active equalization apparatus according to an embodiment of the present application.

As shown in FIG. 1, the frequency gating battery active equalization apparatus includes a controlled alternating current power supply 101, an alternating current electric energy allocation unit 102, a filter unit 103 (such as a filter 1 to a filter N, where N is a positive integer greater than 1), a rectifier unit 104 (Rectifier unit, Rec for short) (such as Rec1 to RecN), and an equalization control unit 105. The alternating current electric energy allocation unit 102 includes at least one input port In1 and N output ports, and the N output ports are numbered Out1 to OutN. The frequency gating battery active equalization apparatus determines a frequency interval of a filter unit 103 corresponding to a battery unit that needs to be supplemented with energy. Each battery unit (such as B1, B2, . . . , or BN) in a battery pack 106 has a corresponding filter unit 103. Frequency intervals corresponding to any two filter units 103 have mutually non-overlapping parts. The frequency gating battery active equalization apparatus outputs an alternating current voltage whose frequency falls within the frequency interval, so that the battery unit that needs to be supplemented with energy is charged. The outputting an alternating current voltage whose frequency falls within the frequency interval includes: outputting a frequency instruction signal to the controlled alternating current power supply 101, so that the controlled alternating current power supply 101 outputs an alternating current voltage corresponding to the frequency instruction signal. The frequency instruction signal falls within a frequency interval corresponding to a conductive path on which the battery that needs to be supplemented with energy is located. In addition, the frequency instruction signal does not fall within a frequency interval corresponding to a conductive path on which any another battery that does not need to be supplemented with energy is located.

Figure 2:
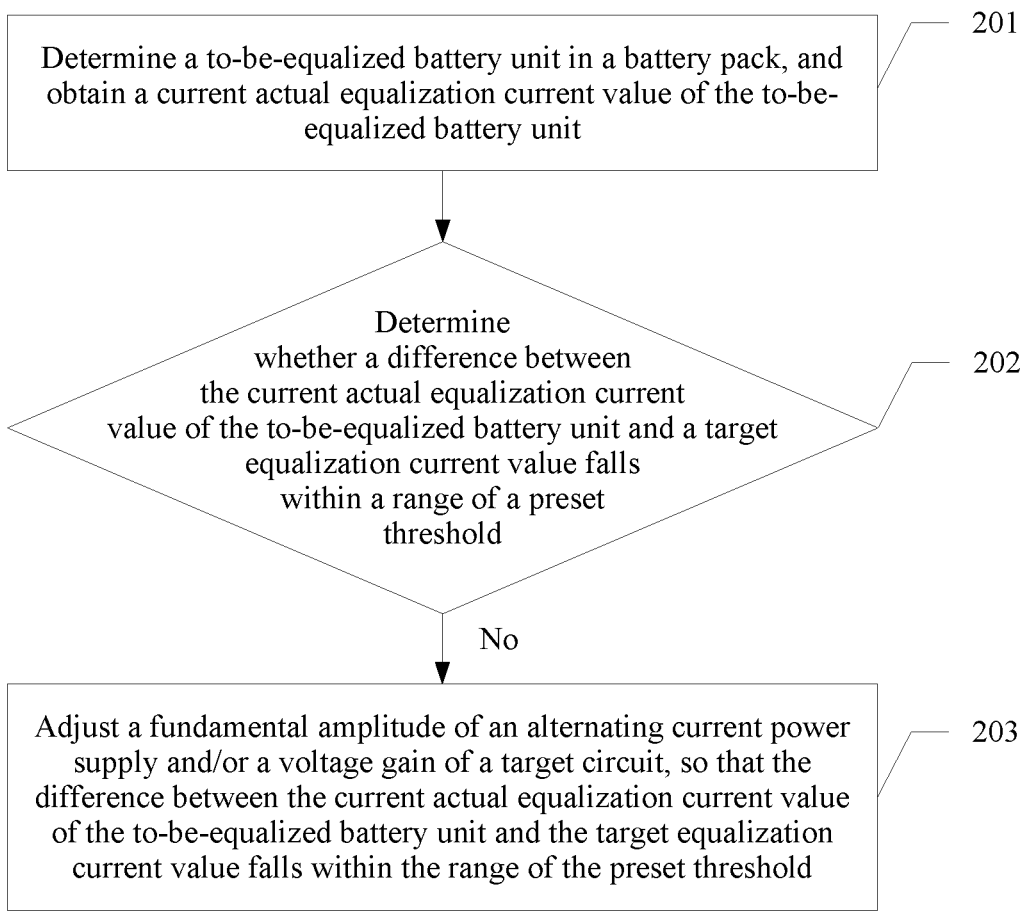
FIG. 2 is a schematic diagram of an equalization current adjustment method according to an embodiment of the present application.

Referring to FIG. 2, an embodiment of an equalization current adjustment method according to an embodiment of the present application is provided. The equalization current adjustment method is applied to a frequency gating battery pack active equalization apparatus. This embodiment includes: determining a battery unit to be equalized in a battery pack, and obtaining a current actual equalization current value of the battery unit; and when it is determined that a difference between the current actual equalization current value of the battery unit and a target equalization current value does not fall within a range of a preset threshold, adjusting a fundamental amplitude of an alternating current power supply of a target circuit on which the battery unit is located and/or a voltage gain of the target circuit, so that the difference between the current actual equalization current value of the battery unit and the target equalization current value falls within the range of the preset threshold, where the target equalization current value is an equalization current value determined by the frequency gating battery pack active equalization apparatus according to a current energy status of the battery unit, and the target circuit is a circuit that includes a circuit component connected to the battery unit, the alternating current power supply, and the battery unit.

A specific process is as follows:

Operation 201: Determine a battery unit to be equalized in a battery pack, and obtain a current actual equalization current value of the battery unit.

The frequency gating battery pack active equalization apparatus determines the battery unit in the battery pack by detecting energy statuses of all battery units in the battery pack, or the frequency gating battery pack active equalization apparatus obtains the battery unit in the battery pack from a terminal. The battery unit is configured to indicate a battery unit that needs to be supplemented with energy. Certainly, the battery unit may be one battery unit, or may be multiple battery units. This is not specifically limited herein.

In one embodiment, the frequency gating battery pack active equalization apparatus determines the battery unit by detecting a status parameter of each battery unit. The status parameter may be a voltage, may be a current, or may be an SOC obtained by calculation by the frequency gating battery pack active equalization apparatus. This is not specifically limited herein.

The frequency gating battery pack active equalization apparatus obtains the current actual equalization current value of the battery unit by detecting a current of the battery unit. There are many specific methods for detecting the current actual equalization current value of the battery unit, such as using a hall current sensor or performing resistance sampling. In one embodiment, a sensor detects the current of the battery unit, so as to obtain the current actual equalization current value of the battery unit, and sends the current actual equalization current value of the battery unit to the frequency gating battery pack active equalization apparatus; or the sensor detects the current of the battery unit, so as to obtain the current actual equalization current value of the battery unit, and sends the current actual equalization current value of the battery unit to another battery unit other than the battery unit, and the another battery unit sends the current actual equalization current value of the battery unit to the frequency gating battery pack active equalization apparatus. Alternatively, the frequency gating battery pack active equalization apparatus obtains, by calculation, the current actual equalization current value of the battery unit by obtaining a related parameter of the battery unit, and so on. This is not specifically limited herein.

Operation 202: Determine whether a difference between the current actual equalization current value of the battery unit and a target equalization current value falls within a range of a preset threshold. If the difference between the current actual equalization current value of the battery unit and the target equalization current value does not fall within the range of the preset threshold, perform operation 203.

The target equalization current value is an equalization current value determined by the frequency gating battery pack active equalization apparatus according to a current energy status of the battery unit. The target circuit is a circuit that includes a circuit component connected to the battery unit, the alternating current power supply, and the battery unit.

It may be learned that when it is determined that the difference between the current actual equalization current value of the battery unit and the target equalization current value does not fall within the range of the preset threshold, it is determined that the battery unit needs to be supplemented with energy.

When it is determined that the difference between the current actual equalization current value of the battery unit and the target equalization current value falls within the range of the preset threshold, the following step 203 does not need to be performed, and the current actual equalization current value of the battery unit is kept unchanged.

Operation 203: When it is determined that the difference between the current actual equalization current value of the battery unit and the target equalization current value does not fall within the range of the preset threshold, adjust a fundamental amplitude of an alternating current power supply of a target circuit on which the battery unit is located and/or a voltage gain of the target circuit, so that the difference between the current actual equalization current value of the battery unit and the target equalization current value falls within the range of the preset threshold.

It may be learned that the target circuit is a conducting circuit on which the battery unit is located. The fundamental amplitude of the alternating current power supply of the target circuit and/or the voltage gain of the target circuit are/is adjusted, so as to indirectly achieve a purpose of adjusting the current actual equalization current value of the battery unit. In one embodiment, the fundamental amplitude of the alternating current power supply and/or the voltage gain of the target circuit may be adjusted for multiple times, until the difference between the current actual equalization current value of the battery unit and the target equalization current value falls within the range of the preset threshold, so as to achieve a purpose of energy equalization of each battery unit.

In one embodiment, as shown in FIG. 3-a, for example, the frequency gating battery active equalization apparatus includes a controlled alternating current power supply, an alternating current electric energy allocation unit, a filter unit (such as a filter unit 1 to a filter unit N, where N is a positive integer greater than 1), a rectifier unit (such as a rectifier unit 1 to a rectifier unit N), and an equalization control unit C1.

For example, when the controlled alternating current power supply is implemented by using a direct current power supply, an inverter structure, and an inverter control unit, a voltage output port of the controlled alternating current power supply is connected to an input port In1 of the alternating current electric energy allocation unit. The alternating current electric energy allocation unit is implemented by using a multi-winding coupling transformer structure. An input winding In1 and output windings Out1 to OutN are wound around one magnetic core in a magnetic coupling manner. Out1 to OutN are one-to-one corresponding to the filter units, and are connected to input sides of corresponding filter units. The filter units are implemented by using a series-parallel network of inductor and capacitor elements. An output side of the filter unit is connected to an alternating current side of the rectifier unit. The rectifier unit is implemented by using a full-bridge rectifier that includes a diode. An output side of the rectifier unit is connected to a battery unit. The equalization control unit is connected to the battery unit. The equalization control unit is also connected to the controlled alternating current power supply.

FIG. 3-b shows a target circuit corresponding to the battery unit. According to the target circuit shown in FIG. 3-b, a circuit between an alternating current power supply $V_{AC}$ and a battery unit $V_B$ constructs a two-port network. Therefore, a current $I_B$ flowing into the battery unit $V_B$ is related to a fundamental amplitude of the power supply $V_{AC}$ and a voltage gain of the two-port network. The fundamental amplitude of the power supply $V_{AC}$ and/or the voltage gain of the two-port network are/is adjusted, so that the current $I_B$ of the battery unit $V_B$ meets a preset condition, so as to achieve a purpose of energy equalization of each battery unit.

In this embodiment of the present application, a battery unit to be equalized in a battery pack is determined, and a current actual equalization current value of the battery unit is obtained; and when it is determined that a difference between the current actual equalization current value of the battery unit and a target equalization current value does not fall within a range of a preset threshold, a fundamental amplitude of an alternating current power supply of a target circuit on which the battery unit is located and/or a voltage gain of the target circuit are/is adjusted, so that the difference between the current actual equalization current value of the battery unit and the target equalization current value falls within the range of the preset threshold. It may be learned that an equalization current is adjusted without a limit of an adjustment range by adjusting the amplitude of the alternating current power supply and/or the voltage gain, so that the equalization current may be adjusted in a wide range with high flexibility.

Figure 4:
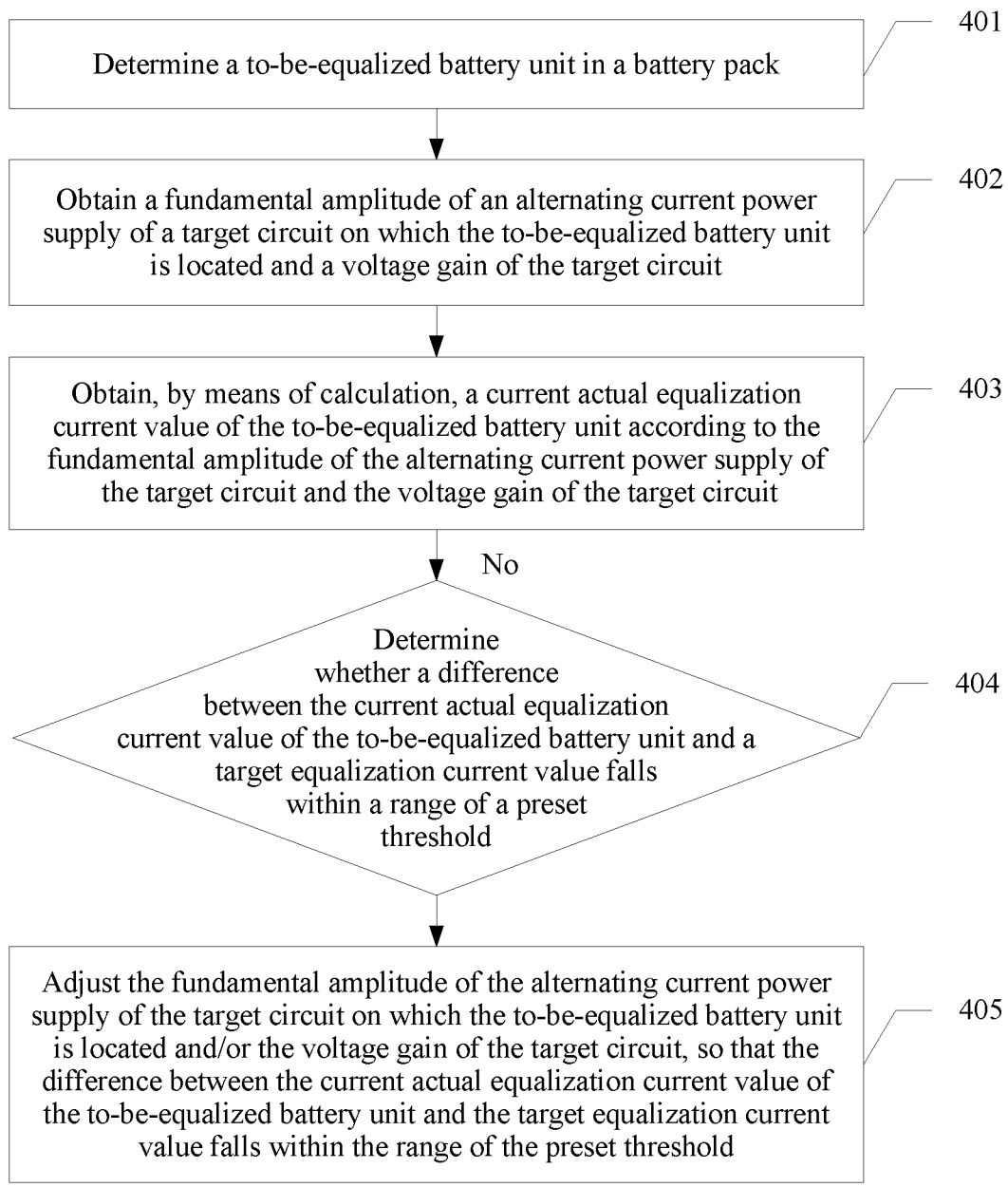
FIG. 4 is a schematic diagram of another embodiment of an equalization current adjustment method according to an embodiment of the present application.

Referring to FIG. 4, an equalization current adjustment method is further described. A specific process is as follows:

Operation 401: Determine a battery unit to be equalized in a battery pack.

Operation 401 is similar to step 201 in the embodiment shown in FIG. 2. Reference may be further made to step 201 in the embodiment shown in FIG. 2. Details are not described herein again.

Operation 402: Obtain a fundamental amplitude of an alternating current power supply of a target circuit on which the battery unit is located and a voltage gain of the target circuit.

Operation 403: Obtain, by calculation, a current actual equalization current value of the battery unit according to the fundamental amplitude of the alternating current power supply of the target circuit and the voltage gain of the target circuit.

It may be learned that a frequency gating battery pack active equalization apparatus obtains, by calculation, the current actual equalization current value of the battery unit according to the fundamental amplitude of the alternating current power supply of the target circuit and the voltage gain of the target circuit. Different operating currents corresponding to series battery units may be obtained. An equalization current obtained by calculation has high accuracy, and therefore this helps improve SOC calculation accuracy of a battery pack and of a battery unit.

In some optional embodiments, the obtaining a fundamental amplitude of an alternating current power supply of a target circuit and a voltage gain of the target circuit includes:

obtaining a driver phase shift angle and a voltage amplitude of a direct current power supply that are related to the fundamental amplitude of the alternating current power supply of the target circuit, where the driver phase shift angle is a driver phase shift angle of a switch structure in the alternating current power supply, and the alternating current power supply is formed according to the direct current power supply and the switch structure in the alternating current power supply; and obtaining a driving frequency related to the voltage gain of the target circuit, where the driving frequency is a driving frequency of the switch structure in the alternating current power supply; and the obtaining, by calculation, the current actual equalization current value of the battery unit according to the fundamental amplitude of the alternating current power supply of the target circuit and the voltage gain of the target circuit includes:

obtaining, by calculation, the current actual equalization current value of the battery unit according to the driver phase shift angle, the voltage amplitude of the direct current power supply, and the driving frequency.

In other optional embodiments, a current of the battery unit is detected by using a sensor, so as to obtain the current actual equalization current value of the battery unit.

It should be noted that in addition to the two manners in which the current actual equalization current value of the battery unit is obtained from a sensor by the frequency gating battery active equalization apparatus or obtained by the frequency gating battery active equalization apparatus by calculation, the current actual equalization current value of the battery unit may be obtained from a terminal by the frequency gating battery active equalization apparatus, and so on. This is not specifically limited herein.

Operation 404: Determine whether a difference between the current actual equalization current value of the battery unit and a target equalization current value falls within a range of a preset threshold. If the difference between the current actual equalization current value of the battery unit and the target equalization current value does not fall within the range of the preset threshold, perform step 405.

In some optional embodiments, the target equalization current value is an equalization current value obtained from a sensor by the frequency gating battery pack active equalization apparatus or an equalization current value defined by a user. For example, a sensor detects energy statuses of all battery units, so as to determine the target equalization current value, and sends the target equalization current value to the frequency gating battery pack active equalization apparatus. For example, a user defines a target equalization current value on the frequency gating battery pack active equalization apparatus, and the frequency gating battery pack active equalization apparatus receives the target equalization current value defined by the user.

In some optional embodiments, the preset threshold is a threshold defined by a user or a default threshold of the frequency gating battery pack active equalization apparatus.

When the difference between the current actual equalization current value of the battery unit and the target equalization current value falls within the range of the preset threshold, the following step 405 does not need to be performed, and the current actual equalization current value of the battery unit is kept unchanged.

In some optional implementations, in addition to the manner of determining whether the difference between the current actual equalization current value of the battery unit and the target equalization current value falls within the range of the preset threshold, it may be determined whether the current actual equalization current value of the battery unit is equal to the target equalization current value. If the current actual equalization current value of the battery unit is not equal to the target equalization current value, the fundamental amplitude of the alternating current power supply of the target circuit on which the battery unit is located and/or the voltage gain of the target circuit are/is adjusted, so that the current actual equalization current value of the battery unit is equal to the target equalization current value. Certainly, another determining manner may also be selected. This is not specifically limited herein.

In one embodiment, in addition to the threshold defined by the user or the default threshold of the frequency gating battery pack active equalization apparatus, the threshold may be set in another manner. This is not specifically limited herein.

Operation 405: When it is determined that the difference between the current actual equalization current value of the battery unit and the target equalization current value does not fall within the range of the preset threshold, adjust the fundamental amplitude of the alternating current power supply of the target circuit on which the battery unit is located and/or the voltage gain of the target circuit, so that the difference between the current actual equalization current value of the battery unit and the target equalization current value falls within the range of the preset threshold.

It may be learned that the fundamental amplitude of the alternating current power supply and/or the voltage gain of the target circuit are/is adjusted, so as to achieve a purpose of energy equalization of each battery unit.

In some optional embodiments, before the adjusting the fundamental amplitude of the alternating current power supply of the target circuit on which the battery unit is located and/or the voltage gain of the target circuit, the method further includes: when the target equalization current value of the battery unit is determined, obtaining the fundamental amplitude of the alternating current power supply of the target circuit and/or the voltage gain of the target circuit.

It should be noted that the fundamental amplitude of the alternating current power supply of the target circuit and/or the voltage gain of the target circuit may be obtained by external detection by the frequency gating battery pack active equalization apparatus, may be obtained by internal reading by the frequency gating battery pack active equalization apparatus, or may be obtained in a user input manner. This is not specifically limited herein.

Further, an instruction signal of a target parameter is generated according to the fundamental amplitude of the alternating current power supply of the target circuit and/or a voltage gain of the target circuit.

In one embodiment, a control unit in the frequency gating battery pack active equalization apparatus may generate an initial instruction signal of the fundamental amplitude of the alternating current power supply of the target circuit and/or the voltage gain of the target circuit according to the fundamental amplitude of the alternating current power supply of the target circuit and/or the voltage gain of the target circuit.

Further, the instruction signal of the fundamental amplitude of the alternating current power supply of the target circuit and/or the voltage gain of the target circuit is output to a control unit corresponding to the instruction signal of the fundamental amplitude of the alternating current power supply of the target circuit and/or the voltage gain of the target circuit.

It may be learned that the instruction signal of the fundamental amplitude of the alternating current power supply of the target circuit and/or the voltage gain of the target circuit is output to the control unit corresponding to the initial instruction signal of the fundamental amplitude of the alternating current power supply of the target circuit and/or the voltage gain of the target circuit. The initial signal is used as a reference for subsequently adjusting the fundamental amplitude of the alternating current power supply and/or the voltage gain of the target circuit, so as to avoid an extremely heavy workload caused in a subsequent adjustment process due to an extremely large or small adjustment.

In this embodiment of the present application, the fundamental amplitude of the alternating current power supply and/or the voltage gain of the target circuit are/is adjusted, so that the difference between the current actual equalization current value of the battery unit and the target equalization current value falls within the range of the preset threshold. An adjustment range is not limited, so that an equalization current may be adjusted in a wide range with high flexibility.

In one embodiment, when an alternating current power supply $V_{AC}$ shown in FIG. 3-*b* is implemented by using a full-bridge inverter structure shown in FIG. 3-*a*, a fundamental amplitude of the alternating current power supply $V_{AC}$ is related to a voltage amplitude of a direct current power supply DC1 and a driver phase shift angle of a full-bridge inverter unit. Therefore, the fundamental amplitude of the alternating current power supply $V_{AC}$ may be indirectly adjusted by controlling the voltage amplitude of the direct current power supply DC1 or controlling the driver phase shift angle of the full-bridge inverter structure, so as to finally achieve a purpose of adjusting a magnitude of an equalization current $I_B$.

On the other hand, a voltage gain of a two-port network is related to a driving frequency of an alternating current voltage on an input side. Therefore, the voltage gain of the two-port network may be adjusted by controlling a driving frequency of the full-bridge inverter structure, so as to finally achieve the purpose of adjusting the magnitude of the equalization current $I_B$.

It may be learned that the purpose of adjusting the equalization current $I_B$ may be achieved in any one of the three manners: adjusting the voltage amplitude of the direct current power supply DC1, adjusting the driving frequency of the full-bridge inverter structure, or adjusting the driver phase shift angle of the full-bridge inverter structure, thereby having high flexibility.

Certainly, in one embodiment, the alternating current power supply $V_{AC}$ may be implemented in many manners. A corresponding equalization current adjustment method used when the alternating current power supply $V_{AC}$ is implemented by using the full-bridge inverter structure is selected in this embodiment of the present application. A corresponding principle may be generalized to any implementation of the alternating current power supply $V_{AC}$, such as an implementation using a half-bridge inverter structure, a power amplifier structure, or a half-bridge three-level inverter structure. This is not specifically limited herein.

In some optional embodiments, the adjusting the fundamental amplitude of the alternating current power supply, so that the difference between the current actual equalization current value of the battery unit and the target equalization current value falls within the range of the preset threshold includes:

generating, according to the driver phase shift angle, a first instruction signal used to control the driver phase shift angle and/or generating, according to the voltage amplitude of the direct current power supply, a first instruction signal used to control the voltage amplitude of the direct current power supply; and outputting at least one first instruction signal in the first instruction signal used to control the driver phase shift angle and the first instruction signal used to control the voltage amplitude of the direct current power supply to a control unit corresponding to the first instruction signal, so as to adjust the fundamental amplitude of the alternating current power supply, so that the difference between the current actual equalization current value of the battery unit and the target equalization current value falls within the range of the preset threshold.

It may be learned that if the driving frequency is kept unchanged, the purpose of adjusting the equalization current may still be achieved by adjusting the driver phase shift angle and/or the voltage amplitude of the direct current power supply, so that the equalization current may be adjusted in a wide range with high flexibility.

In some optional embodiments, the adjusting the voltage gain of the target circuit, so that the difference between the current actual equalization current value of the battery unit and the target equalization current value falls within the range of the preset threshold includes:

generating, according to the driving frequency, a second instruction signal used to control the driving frequency; and outputting the second instruction signal used to control the driving frequency to a control unit corresponding to the second instruction signal, so as to adjust the voltage gain of the target circuit, so that the difference between the current actual equalization current value of the battery unit and the target equalization current value falls within the range of the preset threshold.

It may be learned that if the driver phase shift angle and the voltage amplitude of the direct current power supply are kept unchanged, the purpose of adjusting the equalization current may still be achieved by adjusting the driving frequency, so that the equalization current may be adjusted in a wide range with high flexibility.

In some optional embodiments, the adjusting the fundamental amplitude of the alternating current power supply and the voltage gain of the target circuit, so that the difference between the current actual equalization current value of the battery unit and the target equalization current value falls within the range of the preset threshold includes:

generating, according to the driver phase shift angle, a first instruction signal used to control the driver phase shift angle and/or generating, according to the voltage amplitude of the direct current power supply, a first instruction signal used to control the voltage amplitude of the direct current power supply;

generating, according to the driving frequency, a second instruction signal used to control the driving frequency; and outputting at least one first instruction signal in the first instruction signal used to control the driver phase shift angle and the first instruction signal used to control the voltage amplitude of the direct current power supply to a control unit corresponding to the first instruction signal, and outputting the second instruction signal used to control the driving frequency to a control unit corresponding to the second instruction signal, so as to adjust the fundamental amplitude of the alternating current power supply and the voltage gain of the target circuit, so that the difference between the current actual equalization current value of the battery unit and the target equalization current value falls within the range of the preset threshold.

It may be learned that the purpose of adjusting the equalization current may still be achieved by using the driving frequency and at least one sub-target parameter in the driver phase shift angle and the voltage amplitude of the direct current power supply, so that the equalization current may be adjusted in a wide range with high flexibility.

In one embodiment, when an alternating current power supply is implemented by using a full-bridge inverter structure, a voltage amplitude of a direct current power supply and a phase shift angle of a full-bridge inverter structure are kept unchanged, and a driving frequency of the full-bridge inverter structure is adjusted. Referring to FIG. 5-$a$, a specific adjustment process is as follows:

$f_1$ and $f_2$ are respectively two driving frequencies that are on an equalization current curve and that are corresponding to $I_{set}$ intersection points. $I_{set}$ is a preset target equalization current value of a battery unit to be equalized. $I_{real}$ is an actual equalization current value of the battery unit. $f_{center}$ is a center frequency of a target circuit currently corresponding to the battery unit. The driving frequencies and the center frequency meet the following relationship: $f_2 > f_{center} > f_1$. $f_s$ is a current driving frequency of a full-bridge inverter structure (such as a current driving frequency of the full-bridge inverter structure in a case of S1, S2, S3, or S4), and $f_s = 1/T_s$. $T_s$ is a current driving cycle of the full-bridge inverter structure. $I_{set}$ is a target equalization current value obtained by an apparatus by calculating currents or voltages of all battery units in a battery pack in advance.

When $f_s > f_2$, such as at a point 1 in the figure, $f_s$ is controlled and decreased by using an equalization control unit, so that a value of $I_{real}$ increases, and a value of $|I_{real}-I_{set}|$ decreases.

When $f_2 > f_s > f_{center}$, such as at a point 2 in the figure, $f_s$ is controlled and increased by using an equalization control unit, so that a value of $I_{real}$ decreases, and a value of $|I_{real}-I_{set}| \uparrow$ decreases.

When $f_{center} > f_s > f_1$, such as at a point 3 in the figure, $f_s$ is controlled and decreased by using an equalization control unit, so that a value of $I_{real}$ decreases, and a value of $|I_{real}-I_{set}|$ decreases.

When $f_{center} > f_1 > f_s$, such as at a point 4 in the figure, $f_s$ is controlled and increased by using an equalization control unit, so that a value of $I_{real}$ increases, and a value of $|I_{real}-I_{set}|$ decreases.

It may be learned that the driving frequency of the full-bridge inverter structure is adjusted for at least one time, until the actual equalization current value of the battery unit reaches the preset target equalization current value, so as to implement current equalization of battery units in an entire battery pack.

In one embodiment, when an alternating current power supply is implemented by using a full-bridge inverter structure, a voltage amplitude of a direct current power supply and a driving frequency of the full-bridge inverter structure are kept unchanged, and a phase shift angle of the full-bridge inverter structure is adjusted. Referring to FIG. 5-*b*, a specific adjustment process is as follows:

$\theta_{set}$ is a phase shift angle that is on an equalization current curve and that is corresponding to an $I_{set}$ intersection point. $I_{set}$ is a preset target equalization current value of a battery unit to be equalized. $\theta_s$ is a current driver phase shift angle of a full-bridge inverter structure (such as a current driver phase shift angle of the full-bridge inverter structure in a case of S1, S2, S3, or S4).

When $\theta_s > \theta_{set}$, such as at a point 1 in the figure, $\theta_s$ is controlled and decreased by using an equalization control unit, so that a value of $I_{real}$ increases, and a value of $|I_{real}-I_{set}|$ decreases.

When $\theta_s < \theta_{set}$, such as at a point 2 in the figure, $\theta_s$ is controlled and increased by using an equalization control unit, so that a value of $I_{real}$ decreases, and a value of $|I_{real}-I_{set}|$ decreases.

It may be learned that the driver phase shift angle of the full-bridge inverter structure is adjusted for at least one time, until the actual equalization current value of the battery unit reaches the preset target equalization current value, so as to implement current equalization of battery units in an entire battery pack.

In one embodiment, when an alternating current power supply is implemented by using a full-bridge inverter structure, a driving frequency and a driver phase shift angle of the full-bridge inverter structure are kept unchanged, and a voltage amplitude of a direct current power supply is adjusted. Referring to FIG. 5-*c*, a specific adjustment process is as follows:

$V_{set}$ is a voltage value that is on an equalization current curve and that is corresponding to an $I_{set}$ intersection point. $I_{set}$ is a preset target equalization current value of a battery unit to be equalized. $V_{dc}$ is a current voltage amplitude of a direct current power supply.

When $V_{dc} > V_{set}$, such as at a point 1 in the figure, $V_{dc}$ is controlled and decreased by using an equalization control unit, so that a value of $I_{real}$ decreases, and a value of $|I_{real}-I_{set}|$ decreases.

When $V_{dc} < V_{set}$, such as at a point 2 in the figure, $V_{dc}$ is controlled and increased by using an equalization control unit, so that a value of $I_{real}$ increases, and a value of $|I_{real}-I_{set}|$ decreases.

It may be learned that the voltage amplitude of the direct current power supply is adjusted for at least one time, until the actual equalization current value of the battery unit reaches the preset target equalization current value, so as to implement current equalization of battery units in an entire battery pack.

In one embodiment, as shown in FIG. 3-*b*, a fundamental amplitude of an alternating current power supply $V_{AC}$ and a voltage gain of a two-port network are directly adjusted, so as to achieve a purpose of adjusting an equalization current. A mathematical description is as follows:

$$\text{function } (I_B, V_B, x, y) = 0 \qquad \text{Formula (1)}$$

x is all fixed parameters of a conductive path corresponding to each battery unit. Fixed parameters x of conductive paths corresponding to different battery units are not exactly the same. In addition, x remains unchanged after a frequency gating battery pack active equalization apparatus is determined, but y is a variable parameter in the frequency gating battery pack active equalization apparatus. After the frequency gating battery pack active equalization apparatus is determined, an equalization control unit may directly or indirectly modify all or some parameters in y.

For example, when the alternating current power supply $V_{AC}$ shown in FIG. 3-*b* is implemented by using the full-bridge inverter structure shown in FIG. 3-*a*, the fundamental amplitude of the alternating current power supply $V_{AC}$ is related to the voltage amplitude of the direct current power supply DC1 and the driver phase shift angle of the full-bridge inverter unit. For the frequency gating battery pack active equalization apparatus shown in FIG. 3-*a*, $C_p$ is first capacitance, $C_s$ is second capacitance, $L_p$ is first inductance, and $L_s$ is second inductance. $C_p$, $L_p$, $C_s$, and $L_s$ are respectively fixed parameters used in a process of calculating an equalization current. All of the driving frequency $f_s$ of the alternating current power supply $V_{AC}$, the driver phase shift angle PF of the full-bridge inverter structure, and the voltage amplitude of the direct current power supply $V_{dc}$ are variable parameters.

In this case, a specific mathematical form of the formula (1) is that a current $I_B$ of a battery unit $V_B$ approximately meets the following relationship within an engineering-allowed range:

$$\frac{V_B}{V_{dc}} = A_v(\theta) \cdot \frac{R_{eq} \| C_{eq} \| C_p \| L_p}{R_{eq} \| C_{eq} \| C_p \| L_p + L_s + 1/C_s} \cdot \frac{4}{\pi} \cos(PF) \qquad \text{Formula (2)}$$

$$\theta = 2 \cdot \tan^{-1}\left(\frac{I_B}{4 \cdot C_p \cdot V_B \cdot f_s}\right),$$

$$A_v(\theta) = 1 + \left(\frac{4}{\pi} - 1\right) \cdot \sin\left(\frac{\theta}{2}\right),$$

$$R_{eq} = \frac{V_B \cdot A_v^2(\theta)}{2 \cdot I_B},$$

$$\beta(\theta) = \frac{\pi}{3} \cdot \left(\sin\left(\frac{\theta}{2}\right) + \cos\left(\frac{\theta}{2}\right) - 1\right), \text{ and}$$

-continued $$C_{eq} = \frac{I_B}{\pi \cdot f_s \cdot V_B \cdot A_v^2(\theta)} \cdot \tan(\beta(\theta))$$

are substituted into the formula (2), so as to obtain the equalization current $I_B$ of the battery unit $V_B$ by calculation.

It may be learned that the target equalization current value of the battery unit is obtained by calculation according to the driver phase shift angle, the voltage amplitude of the direct current power supply, and the driving frequency.

With reference to the foregoing embodiment, an embodiment of an application scenario is provided below:

It is assumed that the frequency gating battery pack active equalization apparatus is used for active equalization of a battery pack that includes four series battery units.

Figure 6:
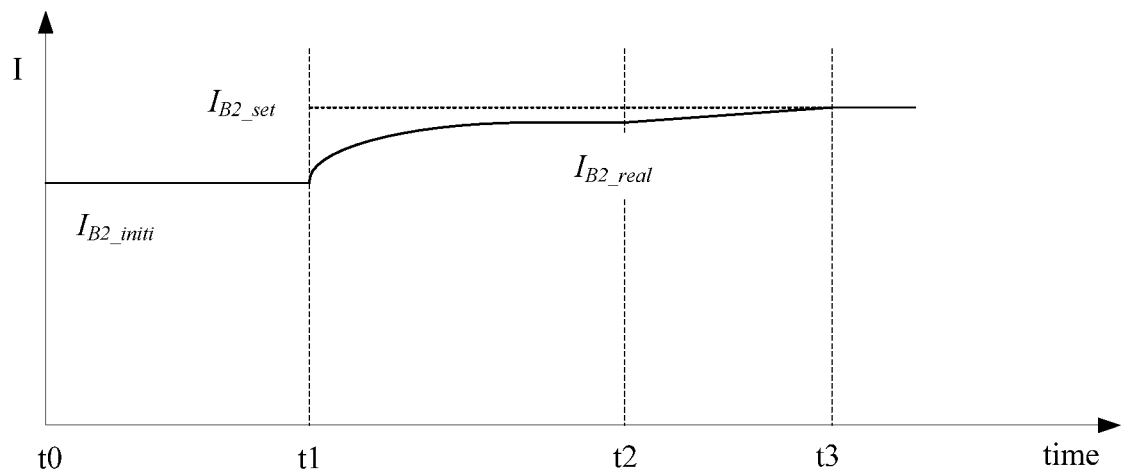
FIG. 6 is a schematic diagram of an embodiment of another application scenario of equalization current adjustment according to an embodiment of the present application.

As shown in FIG. 6, it is assumed that a control unit starts energy equalization for a battery unit B2 at a t0 moment. An initially specified voltage amplitude of a direct current power supply is output to a direct current control unit, and a driver phase shift angle and a driving frequency are output to a full-bridge inverter control unit, so as to obtain, by calculation, a current actual equalization current $I_{B2\_initi}$ corresponding to B2 at the moment.

At a t1 moment, when receiving an equalization current instruction $I_{B2\_set}$ corresponding to B2, an equalization control unit obtains, by calculation, one of the following that meets the equalization current instruction: a corresponding voltage amplitude of the direct current power supply, a corresponding driving frequency of an alternating current power supply, or a corresponding driver phase shift angle of an alternating current power supply, outputs the corresponding voltage amplitude of the direct current power supply at the moment to the direct current control unit, and outputs the driver phase shift angle and the driving frequency to the full-bridge inverter control unit.

At a t2 moment, when detecting that there is still a deviation between an actual equalization current $I_{B2\_real}$ of B2 at the moment and the current instruction $I_{B2\_set}$, the equalization control unit adjusts one or more parameters in three parameters: the voltage amplitude of the direct current power supply, the driver phase shift angle, and the driving frequency, until the actual equalization current $I_{B2\_real}$ of B2 reaches the current instruction $I_{B2\_set}$ at a t3 moment.

To facilitate better implementation of the foregoing related method according to the embodiment of the present application, the following further provides a related apparatus used to cooperate with the foregoing method.

Figure 7:
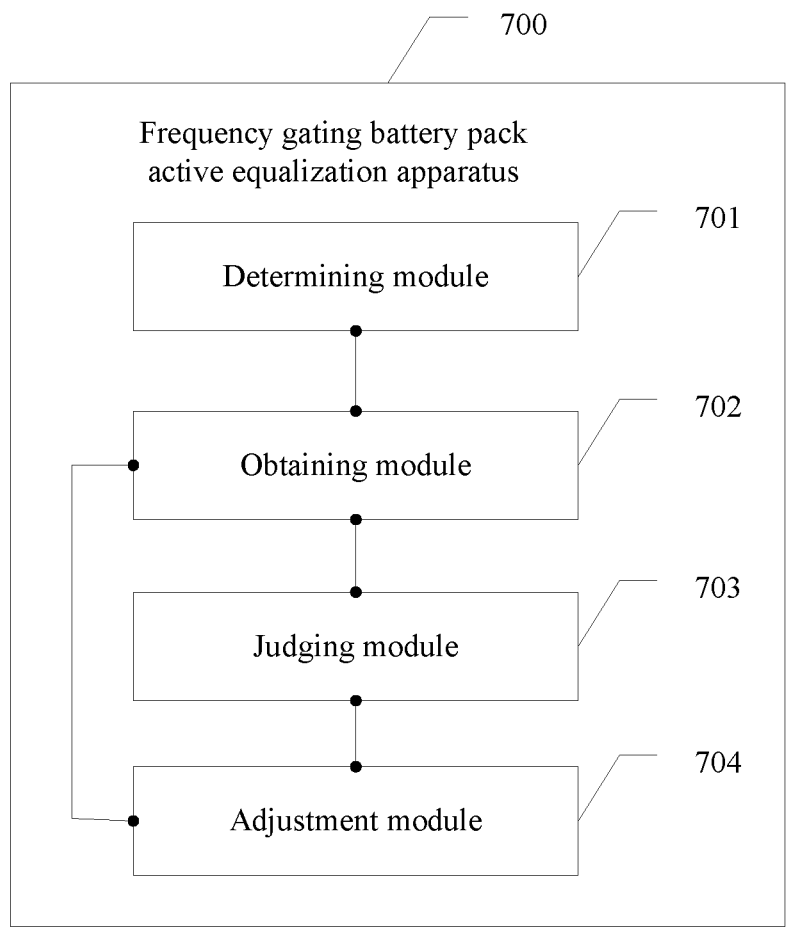
FIG. 7 is a schematic diagram of an embodiment of a frequency gating battery pack active equalization apparatus according to an embodiment of the present application.

Referring to FIG. 7, an embodiment of the present application provides a frequency gating battery pack active equalization apparatus, including: a determining module 701, an obtaining module 702, a judging module 703, and an adjustment module 704.

The determining module 701 is configured to determine a battery unit to be equalized in a battery pack.

The obtaining module 702 is configured to obtain a current actual equalization current value of the battery unit determined by the determining module 701.

The judging module 703 is configured to determine whether a difference between the current actual equalization current value that is of the battery unit and that is obtained by the obtaining module 702 and a target equalization current value falls within a range of a preset threshold.

In some optional embodiments, the preset threshold is a threshold defined by a user or a default threshold of the frequency gating battery pack active equalization apparatus.

In some optional embodiments, the target equalization current value is an equalization current value obtained from a sensor by the frequency gating battery pack active equalization apparatus or an equalization current value defined by a user.

The adjustment module 704 is configured to: when the judging module 703 determines that the difference between the current actual equalization current value of the battery unit and the target equalization current value does not fall within the range of the preset threshold, adjust a fundamental amplitude of an alternating current power supply of a target circuit on which the battery unit is located and/or a voltage gain of the target circuit, so that the difference between the current actual equalization current value of the battery unit and the target equalization current value falls within the range of the preset threshold, where the target equalization current value is an equalization current value determined by the frequency gating battery pack active equalization apparatus according to a current energy status of the battery unit, and the target circuit is a circuit that includes a circuit component connected to the battery unit, the alternating current power supply, and the battery unit.

In this embodiment of the present application, a determining module determines a battery unit to be equalized in a battery pack; an obtaining module obtains a current actual equalization current value of the battery unit; and when the judging module determines that a difference between the current actual equalization current value of the battery unit and a target equalization current value does not fall within a range of a preset threshold, an adjustment module adjusts a fundamental amplitude of an alternating current power supply of a target circuit on which the battery unit is located and/or a voltage gain of the target circuit, so that the difference between the current actual equalization current value of the battery unit and the target equalization current value falls within the range of the preset threshold. It may be learned that an equalization current is adjusted by adjusting the amplitude of the alternating current power supply and/or the voltage gain, so that the equalization current may be adjusted in a wide range with high flexibility.

The following further describes the equalization current adjustment apparatus.

In some optional embodiments, the obtaining module 702 is configured to: obtain the fundamental amplitude of the alternating current power supply of the target circuit and the voltage gain of the target circuit, and obtain, by calculation, the current actual equalization current value of the battery unit according to the fundamental amplitude of the alternating current power supply of the target circuit and the voltage gain of the target circuit.

In other optional embodiments, the obtaining module 702 is configured to detect a current of the battery unit by using a sensor, so as to obtain the current actual equalization current value of the battery unit.

It should be noted that in addition to the two manners in which the current actual equalization current value of the battery unit is obtained from a sensor by the frequency gating battery active equalization apparatus or obtained by the frequency gating battery active equalization apparatus by calculation, the current actual equalization current value of the battery unit may be obtained from a terminal by the frequency gating battery active equalization apparatus, and so on. This is not specifically limited herein.

In some optional embodiments, the obtaining module 702 is configured to: obtain a driver phase shift angle and a voltage amplitude of a direct current power supply that are related to the fundamental amplitude of the alternating current power supply of the target circuit, where the driver phase shift angle is a driver phase shift angle of a switch structure in the alternating current power supply, and the alternating current power supply is formed according to the direct current power supply and the switch structure in the alternating current power supply; obtain a driving frequency related to the voltage gain of the target circuit, where the driving frequency is a driving frequency of the switch structure in the alternating current power supply; and obtain, by calculation, the current actual equalization current value of the battery unit according to the driver phase shift angle, the voltage amplitude of the direct current power supply, and the driving frequency that are obtained by the obtaining module.

The adjustment module 704 is configured to: generate, according to the driver phase shift angle, a first instruction signal used to control the driver phase shift angle and/or generate, according to the voltage amplitude of the direct current power supply, a first instruction signal used to control the voltage amplitude of the direct current power supply; and output at least one first instruction signal in the first instruction signal used to control the driver phase shift angle and the first instruction signal used to control the voltage amplitude of the direct current power supply to a control unit corresponding to the first instruction signal, so as to adjust the fundamental amplitude of the alternating current power supply, so that the difference between the current actual equalization current value of the battery unit and the target equalization current value falls within the range of the preset threshold.

It may be learned that if the driving frequency is kept unchanged, a purpose of adjusting the equalization current may still be achieved by adjusting the driver phase shift angle and/or the voltage amplitude of the direct current power supply, so that the equalization current may be adjusted in a wide range with high flexibility.

The adjustment module 704 is configured to: generate, according to the driving frequency, a second instruction signal used to control the driving frequency, and output the second instruction signal used to control the driving frequency to a control unit corresponding to the second instruction signal, so as to adjust the voltage gain of the target circuit, so that the difference between the current actual equalization current value of the battery unit and the target equalization current value falls within the range of the preset threshold.

It may be learned that if the driver phase shift angle and the voltage amplitude of the direct current power supply are kept unchanged, the purpose of adjusting the equalization current may still be achieved by adjusting the driving frequency, so that the equalization current may be adjusted in a wide range with high flexibility.

The adjustment module 704 is configured to: generate, according to the driver phase shift angle, a first instruction signal used to control the driver phase shift angle and/or generate, according to the voltage amplitude of the direct current power supply, a first instruction signal used to control the voltage amplitude of the direct current power supply; generate, according to the driving frequency, a second instruction signal used to control the driving frequency; output at least one first instruction signal in the first instruction signal used to control the driver phase shift angle and the first instruction signal used to control the voltage amplitude of the direct current power supply to a control unit corresponding to the first instruction signal; and output the second instruction signal used to control the driving frequency to a control unit corresponding to the second instruction signal, so as to adjust the fundamental amplitude of the alternating current power supply and the voltage gain of the target circuit, so that the difference between the current actual equalization current value of the battery unit and the target equalization current value falls within the range of the preset threshold.

It may be learned that the purpose of adjusting the equalization current may still be achieved by using the driving frequency and at least one sub-target parameter in the driver phase shift angle and the voltage amplitude of the direct current power supply, so that the equalization current may be adjusted in a wide range with high flexibility.

It may be learned that the adjustment module adjusts at least one parameter in the three parameters: the driver phase shift angle, the voltage amplitude of the direct current power supply, and the driving frequency, so that the difference between the current actual equalization current value of the battery unit and the target equalization current value falls within the range of the preset threshold. An adjustment range is not limited, so that the equalization current may be adjusted in a wide range with high flexibility.

Further, referring to FIG. 1, a frequency gating battery pack active equalization apparatus is provided, including: a controlled alternating current power supply 101, an alternating current electric energy allocation unit 102, a filter unit 103, a rectifier unit 104, and an equalization control unit 105.

The controlled alternating current power supply 101 is connected to the alternating current electric energy allocation unit 102, the alternating current electric energy allocation unit 102 is connected to the filter unit 103, the filter unit 103 is connected to the rectifier unit 104, the rectifier unit 104 is connected to a battery unit 106 (such as B1, B2, B3, . . . , or BN in FIG. 1) in a battery pack 106, the battery unit 106 is connected to the equalization control unit 105, and the equalization control unit 105 is connected to the controlled alternating current power supply 101.

The equalization control unit 105 is configured to: determine a battery unit to be equalized in the battery pack, and obtain a current actual equalization current value of the battery unit.

The equalization control unit 105 is further configured to: when determining that a difference between the current actual equalization current value of the battery unit and a target equalization current value does not fall within a range of a preset threshold, adjust a fundamental amplitude of an alternating current power supply of a target circuit on which the battery unit is located and/or a voltage gain of the target circuit, so that the difference between the current actual equalization current value of the battery unit and the target equalization current value falls within the range of the preset threshold, where the target equalization current value is an equalization current value determined by the frequency gating battery pack active equalization apparatus according to a current energy status of the battery unit, and the target circuit is a circuit that includes a circuit component connected to the battery unit, the alternating current power supply, and the battery unit.

The equalization control unit determines the battery unit in the battery pack by detecting energy statuses of all battery units in the battery pack, or the equalization control unit obtains the battery unit in the battery pack from a terminal. The battery unit is configured to indicate a battery unit that needs to be supplemented with energy. Certainly, the battery unit may be one battery unit, or may be multiple battery units. This is not specifically limited herein.

In some optional embodiments, the target equalization current value is an equalization current value obtained from a sensor by the frequency gating battery pack active equalization apparatus or an equalization current value defined by a user. For example, a sensor detects energy statuses of all battery units, so as to determine the target equalization current value, and sends the target equalization current value to the frequency gating battery pack active equalization apparatus. For example, a user defines a target equalization current value on the frequency gating battery pack active equalization apparatus, and the frequency gating battery pack active equalization apparatus receives the target equalization current value defined by the user.

In some optional embodiments, the preset threshold is a threshold defined by a user or a default threshold of the frequency gating battery pack active equalization apparatus.

In one embodiment, the equalization control unit determines the battery unit by detecting a status parameter of each battery unit. The status parameter may be a voltage, may be a current, or may be an SOC obtained by calculation by the frequency gating battery pack active equalization apparatus. This is not specifically limited herein.

In some optional embodiments, the equalization control unit 105 is configured to: obtain the fundamental amplitude of the alternating current power supply of the target circuit and the voltage gain of the target circuit, and obtain, by calculation, the current actual equalization current value of the battery unit according to the fundamental amplitude of the alternating current power supply of the target circuit and the voltage gain of the target circuit.

In other optional embodiments, the equalization control unit 105 is configured to detect a current of the battery unit by using a sensor, so as to obtain the current actual equalization current value of the battery unit.

It should be noted that in addition to the two manners in which the current actual equalization current value of the battery unit is obtained from a sensor by the equalization control unit or obtained by the equalization control unit by calculation, the current actual equalization current value of the battery unit may be obtained from a terminal by the equalization control unit, and so on. This is not specifically limited herein.

In some optional embodiments, the equalization control unit 105 is configured to: obtain a driver phase shift angle and a voltage amplitude of a direct current power supply that are related to the fundamental amplitude of the alternating current power supply of the target circuit, where the driver phase shift angle is a driver phase shift angle of a switch structure in the alternating current power supply, and the alternating current power supply is formed according to the direct current power supply and the switch structure in the alternating current power supply; and obtain a driving frequency related to the voltage gain of the target circuit, where the driving frequency is a driving frequency of the switch structure in the alternating current power supply; and the equalization control unit is configured to: obtain, by calculation, the current actual equalization current value of the battery unit according to the driver phase shift angle, the voltage amplitude of the direct current power supply, and the driving frequency.

In some optional embodiments, the equalization control unit 105 is configured to: generate, according to the driver phase shift angle, a first instruction signal used to control the driver phase shift angle and/or generate, according to the voltage amplitude of the direct current power supply, a first instruction signal used to control the voltage amplitude of the direct current power supply; and output at least one first instruction signal in the first instruction signal used to control the driver phase shift angle and the first instruction signal used to control the voltage amplitude of the direct current power supply to a control unit corresponding to the first instruction signal, so as to adjust the fundamental amplitude of the alternating current power supply, so that the difference between the current actual equalization current value of the battery unit and the target equalization current value falls within the range of the preset threshold.

It may be learned that if the driving frequency is kept unchanged, a purpose of adjusting the equalization current may still be achieved by adjusting the driver phase shift angle and/or the voltage amplitude of the direct current power supply, so that the equalization current may be adjusted in a wide range with high flexibility.

In other optional embodiments, the equalization control unit 105 is configured to output the second instruction signal used to control the driving frequency to a control unit corresponding to the second instruction signal, so as to adjust the voltage gain of the target circuit, so that the difference between the current actual equalization current value of the battery unit and the target equalization current value falls within the range of the preset threshold.

It may be learned that if the driver phase shift angle and the voltage amplitude of the direct current power supply are kept unchanged, the purpose of adjusting the equalization current may still be achieved by adjusting the driving frequency, so that the equalization current may be adjusted in a wide range with high flexibility.

In other optional embodiments, the equalization control unit 105 is configured to: generate, according to the driver phase shift angle, a first instruction signal used to control the driver phase shift angle and/or generate, according to the voltage amplitude of the direct current power supply, a first instruction signal used to control the voltage amplitude of the direct current power supply; generate, according to the driving frequency, a second instruction signal used to control the driving frequency; output at least one first instruction signal in the first instruction signal used to control the driver phase shift angle and the first instruction signal used to control the voltage amplitude of the direct current power supply to a control unit corresponding to the first instruction signal; and output the second instruction signal used to control the driving frequency to a control unit corresponding to the second instruction signal, so as to adjust the fundamental amplitude of the alternating current power supply and the voltage gain of the target circuit, so that the difference between the current actual equalization current value of the battery unit and the target equalization current value falls within the range of the preset threshold.

It may be learned that the purpose of adjusting the equalization current may still be achieved by using the driving frequency and at least one sub-target parameter in the driver phase shift angle and the voltage amplitude of the direct current power supply, so that the equalization current may be adjusted in a wide range with high flexibility.

In conclusion, a battery unit to be equalized in a battery pack is determined, and a current actual equalization current value of the battery unit is obtained; and when it is determined that a difference between the current actual equalization current value of the battery unit and a target equalization current value does not fall within a range of a preset threshold, a fundamental amplitude of an alternating current power supply of a target circuit on which the battery unit is located and/or a voltage gain of the target circuit are/is adjusted, so that the difference between the current actual equalization current value of the battery unit and the target equalization current value falls within the range of the preset threshold. It may be learned that an equalization current is adjusted without a limit of an adjustment range by adjusting the amplitude of the alternating current power supply and/or the voltage gain, so that the equalization current may be adjusted in a wide range with high flexibility.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, function units in the embodiments of the present application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. An equalization current adjustment method, the method comprising:
    determining a battery unit to be equalized in a battery pack;
    obtaining a current actual equalization current value of the battery unit; and
    when a difference between the current actual equalization current value and a target equalization current value does not fall within a range of a preset threshold, adjusting a fundamental amplitude of an alternating current power supply of a target circuit on which the battery unit is located or a voltage gain of the target circuit, so that the difference between the current actual equalization current value and the target equalization current value falls within the range of the preset threshold,
    wherein the target equalization current value is obtained by a frequency gating battery pack active equalization apparatus according to a current energy status of the battery unit, and the target circuit comprises a circuit component connected to the battery unit, the alternating current power supply, and the battery unit.

2. The method according to claim 1, wherein obtaining a current actual equalization current value of the battery unit comprises:
    obtaining the fundamental amplitude of the alternating current power supply of the target circuit and the voltage gain of the target circuit; and
    obtaining, by calculation, the current actual equalization current value of the battery unit according to the fundamental amplitude of the alternating current power supply of the target circuit and the voltage gain of the target circuit.

3. The method according to claim 1, wherein obtaining a current actual equalization current value of the battery unit comprises:
    detecting a current of the battery unit using a sensor, so as to obtain the current actual equalization current value of the battery unit.

4. The method according to claim 2, wherein obtaining the fundamental amplitude of the alternating current power supply of the target circuit and the voltage gain of the target circuit comprises:
    obtaining a driver signal phase shift angle and a voltage amplitude of a direct current power supply that are related to the fundamental amplitude of the alternating current power supply of the target circuit, wherein the driver signal phase shift angle is a driver signal phase shift angle of a switch structure in the alternating current power supply, and the alternating current power supply includes the direct current power supply and the switch structure in the alternating current power supply; and
    obtaining a driving frequency related to the voltage gain of the target circuit, wherein the driving frequency is a driving frequency of the switch structure in the alternating current power supply; and
    wherein obtaining the current actual equalization current value of the battery unit according to the fundamental amplitude of the alternating current power supply of the target circuit and the voltage gain of the target circuit comprises:

obtaining, by calculation, the current actual equalization current value of the battery unit according to the driver signal phase shift angle, the voltage amplitude of the direct current power supply, and the driving frequency.

5. The method according to claim 4, wherein adjusting the fundamental amplitude of the alternating current power supply comprises:
generating, according to the driver signal phase shift angle, a first instruction signal to control the driver signal phase shift angle or generating, according to the voltage amplitude of the direct current power supply, a second instruction signal to control the voltage amplitude of the direct current power supply; and
outputting at least one of the first instruction signal and the second instruction signal to a control unit corresponding to the first instruction signal or the second instruction signal to adjust the fundamental amplitude of the alternating current power supply, so that the difference between the current actual equalization current value of the battery unit and the target equalization current value falls within the range of the preset threshold.

6. The method according to claim 4, wherein adjusting the voltage gain of the target circuit comprises:
generating, according to the driving frequency, a second instruction signal to control the driving frequency; and
outputting the second instruction signal to a control unit corresponding to the second instruction signal to adjust the voltage gain of the target circuit, so that the difference between the current actual equalization current value of the battery unit and the target equalization current value falls within the range of the preset threshold.

7. The method according to claim 4, wherein adjusting the fundamental amplitude of the alternating current power supply and the voltage gain of the target circuit comprises:
generating, according to the driver signal phase shift angle, a first instruction signal to control the driver signal phase shift angle or generating, according to the voltage amplitude of the direct current power supply, a second instruction signal to control the voltage amplitude of the direct current power supply;
generating, according to the driving frequency, a third instruction signal to control the driving frequency; and
outputting at least one of the first instruction signal and the second instruction, and outputting a third instruction signal to a control unit corresponding to the third instruction signal to adjust the fundamental amplitude of the alternating current power supply and the voltage gain of the target circuit, so that the difference between the current actual equalization current value of the battery unit and the target equalization current value falls within the range of the preset threshold.

8. The method according to claim 1, wherein the preset threshold is defined by a user or a default threshold of the frequency gating battery pack active equalization apparatus.

9. The method according to claim 1, wherein the target equalization current value is obtained from the sensor by the frequency gating battery pack active equalization apparatus or is defined by a user.

10. A frequency gating battery pack active equalization apparatus, comprising:
a controlled alternating current power supply;
an alternating current electric energy allocation unit coupled to the controlled alternating current power supply;
a filter unit coupled to the alternating current electric energy allocation unit;
a rectifier unit coupled to the filter unit; and
an equalization control unit coupled to the controlled alternating current power supply, wherein the equalization control unit is configured to:
determine a battery unit to be equalized in a battery pack, and obtain a current actual equalization current value of the battery unit, and
when a difference between the current actual equalization current value and a target equalization current value does not fall within a range of a preset threshold, adjust a fundamental amplitude of an alternating current power supply of a target circuit on which the battery unit is located or a voltage gain of the target circuit, so that the difference between the current actual equalization current value of the battery unit and the target equalization current value falls within the range of the preset threshold, wherein the target equalization current value is an equalization current value obtained by a frequency gating battery pack active equalization apparatus according to a current energy status of the battery unit, and the target circuit comprises a circuit component connected to the battery unit, the alternating current power supply, and the battery unit.

11. The apparatus according to claim 10, wherein the equalization control unit is configured to:
obtain the fundamental amplitude of the alternating current power supply of the target circuit and the voltage gain of the target circuit, and
obtain, by calculation, the current actual equalization current value of the battery unit according to the fundamental amplitude of the alternating current power supply of the target circuit and the voltage gain of the target circuit.

12. The apparatus according to claim 10, wherein the equalization control unit is configured to detect a current of the battery unit using a sensor to obtain the current actual equalization current value of the battery unit.

13. The apparatus according to claim 11, wherein
the equalization control unit is configured to:
obtain a driver signal phase shift angle and a voltage amplitude of a direct current power supply that are related to the fundamental amplitude of the alternating current power supply of the target circuit, wherein the driver signal phase shift angle is a driver signal phase shift angle of a switch structure in the alternating current power supply, and the alternating current power supply is formed according to the direct current power supply and the switch structure in the alternating current power supply; and
obtain a driving frequency related to the voltage gain of the target circuit, wherein the driving frequency is a driving frequency of the switch structure in the alternating current power supply, and
wherein the equalization control unit is configured to obtain, by calculation, the current actual equalization current value of the battery unit according to the driver signal phase shift angle, the voltage amplitude of the direct current power supply, and the driving frequency.

14. The apparatus according to claim 13, wherein the equalization control unit is configured to:
generate, according to the driver signal phase shift angle, a first instruction signal to control the driver signal phase shift angle or generate, according to the voltage amplitude of the direct current power supply, a second instruction signal to control the voltage amplitude of the direct current power supply; and output at least one of the first instruction signal and the second instruction signal to a control unit corresponding to the first instruction signal or the second instruction signal to adjust the fundamental amplitude of the alternating current power supply, so that the difference between the current actual equalization current value of the battery unit and the target equalization current value falls within the range of the preset threshold.

15. The apparatus according to claim 13, wherein
the equalization control unit is configured to output a third instruction signal to control the driving frequency to a control unit corresponding to the third instruction signal to adjust the voltage gain of the target circuit, so that the difference between the current actual equalization current value of the battery unit and the target equalization current value falls within the range of the preset threshold.

16. The apparatus according to claim 13, wherein the equalization control unit is configured to:

generate, according to the driver signal phase shift angle, a first instruction signal to control the driver signal phase shift angle or generate, according to the voltage amplitude of the direct current power supply, a second instruction signal to control the voltage amplitude of the direct current power supply;

generate, according to the driving frequency, a third instruction signal to control the driving frequency;

output at least one of the first instruction signal and the second instruction signal to a control unit corresponding to the first instruction signal or the second instruction signal; and output a third instruction signal to control the driving frequency to a control unit corresponding to the third instruction signal to adjust the fundamental amplitude of the alternating current power supply and the voltage gain of the target circuit, so that the difference between the current actual equalization current value of the battery unit and the target equalization current value falls within the range of the preset threshold.

* * * * *